5753X
I. Doolittle,
Charcoal Kiln.
Patented Dec. 14. 1829.
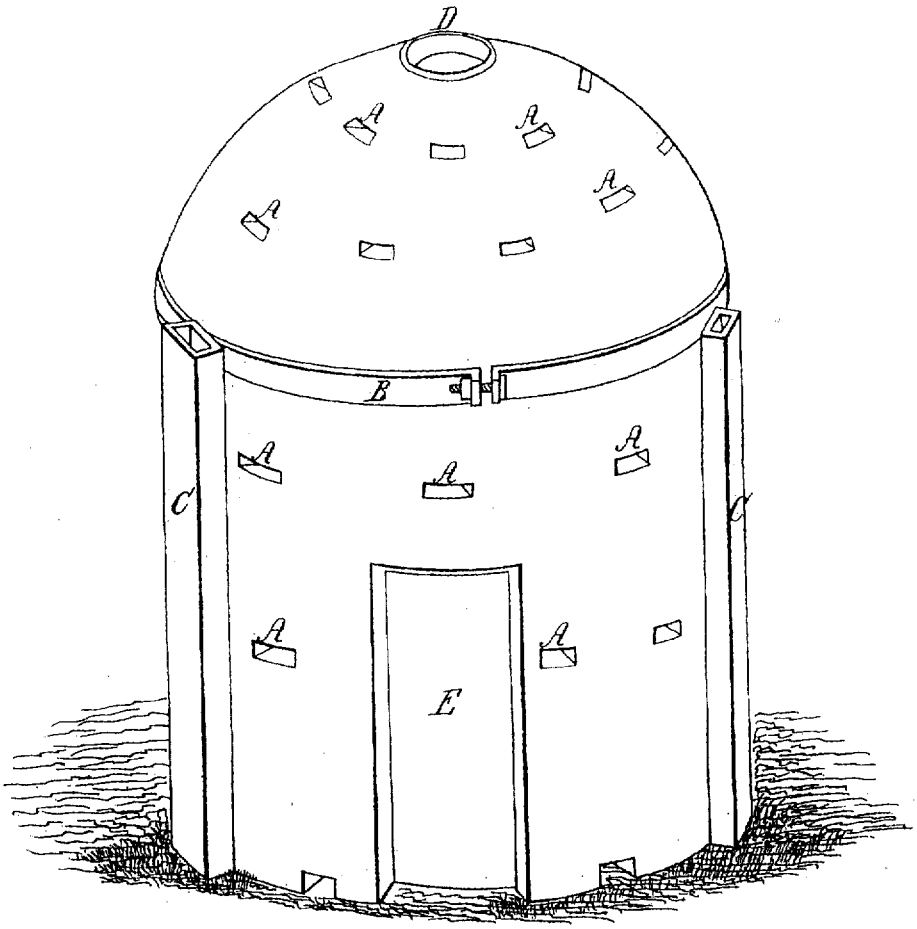

X 5753 12-14-1829 277.

Isaac Doolittle, Bennington Vermont.

Letters Patent.

The Schedule referred to in these Letters Patent and
making part of the same, containing a description in the words of the said
Isaac Doolittle, himself of his improvement in the art of charring wood
for the manufacture of Charcoal..

To all persons to whom these presents shall come. Isaac Doolittle
of Bennington, in the County of Bennington & State of Vermont, sends greeting.
Be it known that I the said Isaac Doolittle, have invented, constructed,
made and applied to use a new & useful improvement in the art of charring
wood for the manufacture of Charcoal, specified in the words following, viz.
This improvement consists in charring the wood in close & permanent
kilns, instead of covering it in the usual way with leaves, straw or sods
& earth; The kiln is built of bricks, stones or other proper materials, laid
in mortar, and may be either circular or square or of any other form, tho' I prefer
the circular shape, on account of the greater facility of supporting the roof, as will
be seen hereafter. Kilns may be made of any size to hold from one to fifty or
more cords of wood, the walls are built vertically to the height of ten or twelve
feet or more or less as may be convenient; leaving a tier of vent holes at the bottom, &
two or more tiers of vent holes between these & the top of the walls. When the
side walls have attained the height to which it is intended to carry them, the
top is encircled with a strong band of iron, the ends of which should be strongly un
joined, by bolts or otherwise to prevent the spreading of the walls by the weight of
the roof & the top or roof is arched over in the form of a dome, leaving one or more
tiers of vent holes on the dome between the spring of the arch & the center & an
opening of about one foot diameter in the center of the dome; the vents in each or
tier or range should be at the distance of three to four feet from each other on
the outside of the kiln, & about ten or twelve feet asunder, are chimnies rising
from the foot vents to near the top of the kiln to facilitate the working; the
intermediate foot vents are exposed to view & left open or closed as may be

X5753 required; in the side walls are left one or more openings as conveni-
ence demands in the form of doors, for charging with wood & dis-
charging coals. The bottom of the floor of the kiln is laid with its
outer edge on a level with the bottom of the foot vents, & is slightly
raised towards the centre; this may be made of a floor of common
boards laid on sand & covered with three or four inches of clay
smoothly & compactly laid on or it may flagged with stones or
paved with bricks, or in any other manner which will render
it smooth & solid. The kiln may be filled with wood either
by setting the wood on end, as in the ordinary coal pit, or by
laying it down as in a cord heap, if the latter method which I
prefer, be adopted, it will be well to place some small pieces of
wood loosely over the bottom, for the body of wood to rest upon, in order
that the air may circulate freely under it. The smallest & driest
wood should be placed at the bottom of the kiln reserving the
largest (& it is no matter how large) for the upper half. A chim-
ney of wood may be laid in the middle corresponding with
the opening in the centre of the dome; if so, some dry wood or
brands should be placed in the centre at the bottom. When the
kiln is entirely filled with wood the charging doors must be
closed, either with iron doors luted, or by mason work; & the fire
introduced thro the central opening at the top; when the fire
is kindled this opening must also be closed, which may be done by
laying over it an iron plate & some earth; the fire can be easily
and effectually governed by opening or closing vents as cir-
cumstances require; an experienced collier may very soon learn
to discover & to know the state of the fire within from the nature
of the smoke from the vents & to draw the fire whichever way he chooses;
when the wood is sufficiently charred, the fire may be easily extinguished
by closing all the vents and every fissure hermetically; & in a few days
it will be sufficiently cool to open & draw out the coals & substitute other
wood when the operation recommences. What I claim as new and
as the object of this application is the construction of permanent
kilns

X5753 kilns above ground, with arched roofs, chimnies, & vent holes
as above described and for the purpose aforesaid, & of a size
sufficient to do business on an extensive scale. By the addition
of a simple apparatus, this method of charring wood may afford
vast quantities of pyroligneous acid, which may be applied
to a variety of uses in the arts.

In Testimony that the above is a true specification
of my said improvement as above described, I have hereunto
set my hand & seal, this sixteenth day of Nov.r in the year
of our Lord one thousand eight hundred & twenty nine.

A B Stiles
L. L. Taft } Witnesses

I. Doolittle

Exd
[illegible]

[illegible]